United States Patent
Moukaddem et al.

(10) Patent No.: US 11,061,748 B2
(45) Date of Patent: Jul. 13, 2021

(54) SYSTEMS, METHODS, AND DEVICES FOR CODE DISTRIBUTION AND INTEGRATION WITHIN A DISTRIBUTED COMPUTING PLATFORM

(71) Applicant: Salesforce.com, Inc., San Francisco, CA (US)

(72) Inventors: Ryed Moukaddem, Sydney (AU); Ali Nahid, Sydney (AU)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/517,207

(22) Filed: Jul. 19, 2019

(65) Prior Publication Data
US 2021/0019205 A1    Jan. 21, 2021

(51) Int. Cl.
*G06F 9/54* (2006.01)
*G06F 8/65* (2018.01)
*G06F 8/41* (2018.01)
*G06F 8/30* (2018.01)

(52) U.S. Cl.
CPC .............. *G06F 9/548* (2013.01); *G06F 8/315* (2013.01); *G06F 8/425* (2013.01); *G06F 8/427* (2013.01); *G06F 8/65* (2013.01); *G06F 8/30* (2013.01)

(58) Field of Classification Search
CPC . G06F 9/548; G06F 8/30; G06F 8/315; G06F 8/40–427; G06F 8/65
USPC ........ 717/106–108, 115, 136, 137, 140–143, 717/148
See application file for complete search history.

(56) References Cited

U.S. PATENT DOCUMENTS 8,671,387 B2 * 3/2014 Quine ................. G06F 9/45529
717/105
9,501,304 B1 * 11/2016 Powers ............... G06F 9/45504
(Continued)

OTHER PUBLICATIONS

Moens, H., et al., Feature-Based Application Development and Management of Multi-Tenant Applications in Clouds, SPLC '14: Proceedings of the 18th International Software Product Line Conference—vol. 1, Sep. 2014, pp. 72-81, [retrieved on Mar. 5, 2021], Retrieved from the Internet: <URL:http://dl.acm.org/>.*

(Continued)

*Primary Examiner* — Geoffrey R St Leger
(74) *Attorney, Agent, or Firm* — Kwan & Olynick LLP

(57) ABSTRACT

Computing platforms are implemented using server systems. A computing platform is configurable to cause processing of a script object generated based on an input from a user, the script object including user code written in a custom scripting language. The computing platform is also configurable to cause the generating of an executable object based on the script object. The computing platform being configurable to cause executing the executable object against an interface layer associated with the computing platform, the interface layer being configured to provide an interface to an application account associated with an application implemented within the computing platform. The computing platform being configurable to cause generating at least one computing platform object based, at least in part, on the executing of the executable object at the interface layer, the at least one computing platform object being a data object having a format native to the computing platform.

20 Claims, 9 Drawing Sheets

(56) References Cited

U.S. PATENT DOCUMENTS

| | | | |
|---|---|---|---|
| 2012/0291005 A1* | 11/2012 | Quine | G06F 9/45529 |
| | | | 717/105 |
| 2019/0073693 A1 | 3/2019 | Moukaddem et al. | |
| 2019/0132355 A1* | 5/2019 | Egbert | H04L 63/1416 |
| 2019/0179678 A1* | 6/2019 | Banerjee | G06F 9/5072 |

OTHER PUBLICATIONS

Truyen, E., et al., Context-oriented Programming for Customizable SaaS Applications, SAC '12: Proceedings of the 27th Annual ACM Symposium on Applied Computing, Mar. 2012, p. 418-425, [retrieved on Mar. 5, 2021], Retrieved from the Internet: <URL:http://dl.acm.org/>.*

* cited by examiner

SYSTEMS, METHODS, AND DEVICES FOR CODE DISTRIBUTION AND INTEGRATION WITHIN A DISTRIBUTED COMPUTING PLATFORM

FIELD OF TECHNOLOGY

This patent document relates generally to distributed computing platforms and more specifically to custom code implementation in distributed computational environments.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One type of service provided via the cloud is an on-demand computing platform. In an on-demand computing platform, the cloud computing service provider manages the underlying infrastructure, which may be a distributed database infrastructure, while users may store data in the cloud rather than on their premises.

BRIEF DESCRIPTION OF THE DRAWINGS

The included drawings are for illustrative purposes and serve only to provide examples of possible structures and operations for the disclosed inventive systems, apparatus, methods and computer program products for code distribution and integration within a distributed computing platform. These drawings in no way limit any changes in form and detail that may be made by one skilled in the art without departing from the spirit and scope of the disclosed implementations.

DETAILED DESCRIPTION

Figure 1:
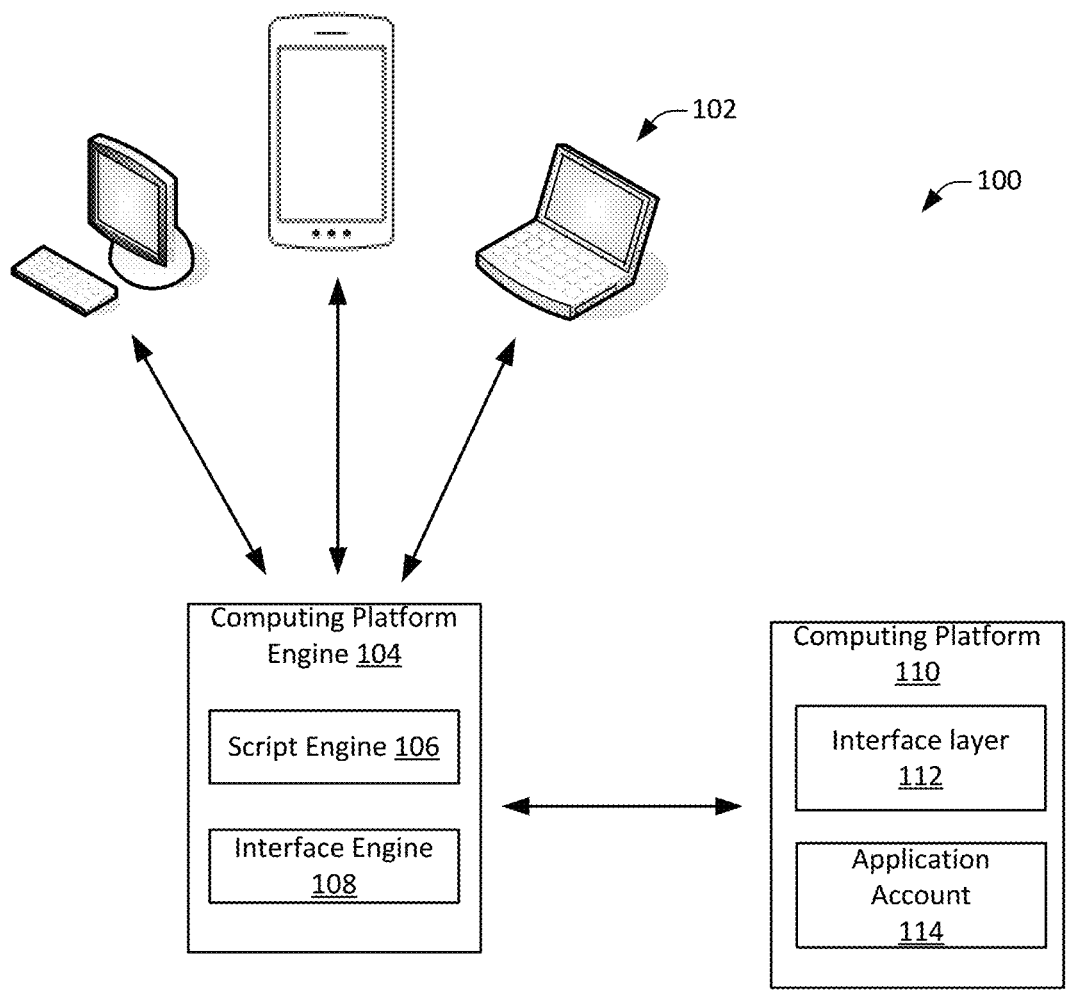
FIG. 1 illustrates an example of a system for code distribution and integration within a distributed computing platform, configured in accordance with some embodiments.

On-demand computing platforms may be used to host applications that can be used by numerous users in a distributed manner across various geographical locations. Accordingly, in such computing platforms, utilization of the application is provided to the users by one or more servers accessible over the Internet rather than installing software locally on in-house computer systems. In this way, the application is provided to the user via a web-based interface, and execution of the application as well as storage of associated files and data is implemented using a distributed or cloud-based computing infrastructure.

In such situations as discussed above and where applications are provided to users as software as a service (SaaS) platforms, the user is typically provided with a web-based interface where the interface is used to load new screens, create data records such as data extensions, as well as perform other actions via a limited set of inputs which may include mouse clicks and typing into the user interface. Accordingly, the extent to which the user is able to configure the application implemented in this context is limited. For example, the user is not provided access to the application code, and is not able to configure the application code. The user is not able to develop new code that is deployed within the application hosted on the computing platform. Moreover, repeated clicks and inputs to implement groups of actions can be laborious and impractical.

Various implementations disclosed herein provide a user with the ability to efficiently generate and deploy custom code within the application hosted by the computing platform. As will be discussed in greater detail below, a computing platform engine may be configured to manage communications between the user and the computing platform, and may be further configured to implement a custom scripting language that enables the generation and execution of executable objects against an interface layer of the computing platform. In this way, the computing platform engine provides a user with the ability to generate a script object written using a custom scripting language specific to the computing platform, and further provides the ability to transform the script object into a computing platform native object that may be deployed in the computing platform. In this way, the user is provided with the ability to quickly generate custom code that may be deployed within the application hosted on the computing platform. Moreover, the user may access and modify existing computing platform objects. In various embodiments, a computing platform object may be a data object that is specific to a computing platform, and may be part of a computing platform's application code. For example, a computing platform object may be part of the application's configuration code or may be particular type of data object associated with facilitating and managing user inputs and interactions, such as a data extension, a user search interface, automation extension, query interface, of email account. In this way, the user may update and modify configuration code of the application hosted by the computing platform.

In one example, an application may be a marketing cloud platform, such as the Salesforce Marketing Cloud Platform provided by Salesforce.com®, that provides a user with the ability to develop custom data models and personalized marketing communication messages across multiple communications channels. In this way, such a marketing cloud platform may be implemented across multiple geographical domains, accessed by many users, and used to provide marketing communication messages to individuals across many different types of communication channels and also in multiple different geographical domains.

As will be discussed in greater detail below, a computing platform engine may be implemented such that a user is provided with the ability to generate custom script objects that the computing platform engine then transforms to executable objects. For example, the user may create a custom script object for a new data extension to be used in the Salesforce Marketing Cloud Platform. The computing platform engine may transform that script object into an executable object, and may then execute the executable object against an interface layer of the computing platform. The result of the executing may be a computing platform object that is an object native to the Salesforce Marketing Cloud Platform. Accordingly, the computing platform object may be provided to and integrated with the Salesforce Marketing Cloud Platform to create the new data extension.

Moreover, a user may be able to create reusable code that can be deployed to any portion of any instance of an application. Thus, the reusability of the code increases the speed and efficiency of development and deployment of custom code. Moreover, configuration code may easily be implemented or transferred between different computational environments. Furthermore, as will be discussed in greater detail below existing configuration code may be reverse engineered to executable objects that may be used for editing or backup purposes. Further still, the implementation of such a computing platform engine further enables the utilization of source version control in a data store or repository, thus enabling operations such as a rollback. Moreover, the deployment of code may be automated, thus greatly increasing the efficiency of such deployments, and also decreasing human errors that may be associated with such deployments.

Furthermore, as will be discussed in greater detail below, the custom scripting language utilized to generate the executable objects is modified to have a human readable format that increases the ease of coding and generating script objects. Moreover, the script language is able to transform declarative definitions that may be present in application code in computing platform objects into script language and through the usage of variables, enhance the implementation of declarations. The script language may also simplify the SaaS object definitions by auto resolving dependencies among computing platform objects.

FIG. 1 illustrates an example of a system for code distribution and integration within a distributed computing platform, configured in accordance with some embodiments. In various embodiments, a computing platform, such as computing platform 110, may be configured to provide a distributed cloud-based application to various users. Accordingly, such computing platforms may be configured as a SaaS platform in which a user may utilize a web-based user interface to interact with the application. As will be discussed in greater detail below, various embodiments disclosed herein provide a computing platform engine that enables the development, integration, and deployment of custom code within the application hosted by the computing platform.

System 100 may include client machine 102 which is configured to display a user interface, and is also configured to receive an input from a user via the user interface. Accordingly, client machine 102 may be a computing device that includes a display screen and at least one input device. Client machine 102 may also have one or more input devices, such as a keyboard and mouse. While one particular configuration of client machine 102 has been described, it will be appreciated that client machine 102 may have any suitable input device, such as a touchscreen that is included on a mobile device.

System 100 may further include computing platform engine 104 which is configured to receive user inputs from client machine 102. In various embodiments, computing platform engine 104 is further configured to generate a script object based, at least in part, on the user input. As will be discussed in greater detail below, the script object may be generated based on a custom scripting language that is configured based on one or more properties of computing platform 110, which is also discussed in greater detail below. In various embodiments, the custom scripting language is a novel scripting language, also referred to herein as Echo-.Script, that is implemented based on augmentations to a JavaScript Object Notation (JSON) format. More specifically, an object represented in a JSON format may be augmented with engine-specific object notations and function declarations. Accordingly, custom grammar and syntax rules may be utilized to append and enhance the object to include a programming component.

Computing platform engine 104 is further configured to generate one or more executable objects based, at least in part, on the script object. In various embodiments, the executable object may be executable by application hosted on computing platform 110. Accordingly, the executable object may be transformed to a computing platform object, and integrated with application code hosted by computing platform 110. In this way the new code may be deployed within computing platform 110. In various embodiments, computing platform engine 104 is further configured to identify and retrieve computing platform objects and executable objects, and generate script objects based, at least in part, on the executable objects. Accordingly, computing platform engine 104 may also be configured to implement a reverse process in which computing platform objects and executable objects are retrieved, and script objects are generated where such generated script objects may be sent to a user at client machine 102.

In various embodiments, the executable objects are generic relative to computing platform 110. For example, while FIG. 1 illustrates one computing platform, in some embodiments, systems disclosed herein may include numerous computing platforms. Accordingly, a user may intend to generate and deploy custom code across the numerous different computing platforms. In this example, an executable object may be executed against interface layers of the numerous different computing platforms to generate a computing platform object specific to each computing platform. In this way, a user may generate custom code for deployment in the novel scripting language described above, and a reusable executable object may be generated such that the executable object is used to generate and deploy a computing platform object that is specific to each computing platform.

In various embodiments, computing platform engine 104 includes script engine 106 and interface engine 108. Script engine 106 is configured to implement one or more translation and transformation operations. Accordingly, script engine 106 is configured to translate the script objects to abstract syntax trees, which may be subsequently transformed into executable objects, as discussed in greater detail below. Various components, such as a lexer, grammar, parser, and interpreter may be utilized to implement such a translation. Accordingly, the abstract syntax trees may be transformed to executable objects that are custom objects that are configured to be executed against an interface layer of computing platform 110. In various embodiments, the output of script engine 106 may be anonymous abstract object that are provided to interface engine 108 for transformation.

In some embodiments, interface engine 108 is configured to implement one or more transformation operations. More specifically, interface engine 108 is further configured to generate and execute several executable objects against interface layer 112 to generate computing platform objects. In this way, the originally received script objects may be translated and transformed to generate computing platform objects that are native to computing platform 110 and may be integrated with the application code. Additional details regarding the operation of components of computing platform engine 104 are discussed in greater detail below with reference to FIGS. 2-6. Furthermore, as discussed above and in greater detail below, the reverse transformation and translation may also be implemented by computing platform engine 104. In various embodiments, computing platform engine 104, as well as its components such as script engine 106 and interface engine 108, are implemented using a computing device discussed in greater detail below with reference to FIGS. 7-9, and for example, system 900 of FIG. 9.

As discussed above, system 100 may also include computing platform 110 which is configured to host a distributed application. In various embodiments, computing platform 110 further includes interface layer 112 which is configured to provide an interface between the application and various other entities, such as local applications run by users. According to some embodiments, computing platform 110 further includes application account 114 which is configured to store account data associated with the application as well as various other application code. Accordingly, application account 114 may store user profile data as well as configuration data associated with the application. In various embodiments, computing platform 110, as well as its components such as interface layer 112 and application account 114, are implemented using a computing device discussed in greater detail below with reference to FIGS. 7-9, and for example, system 900 of FIG. 9.

Figure 2:
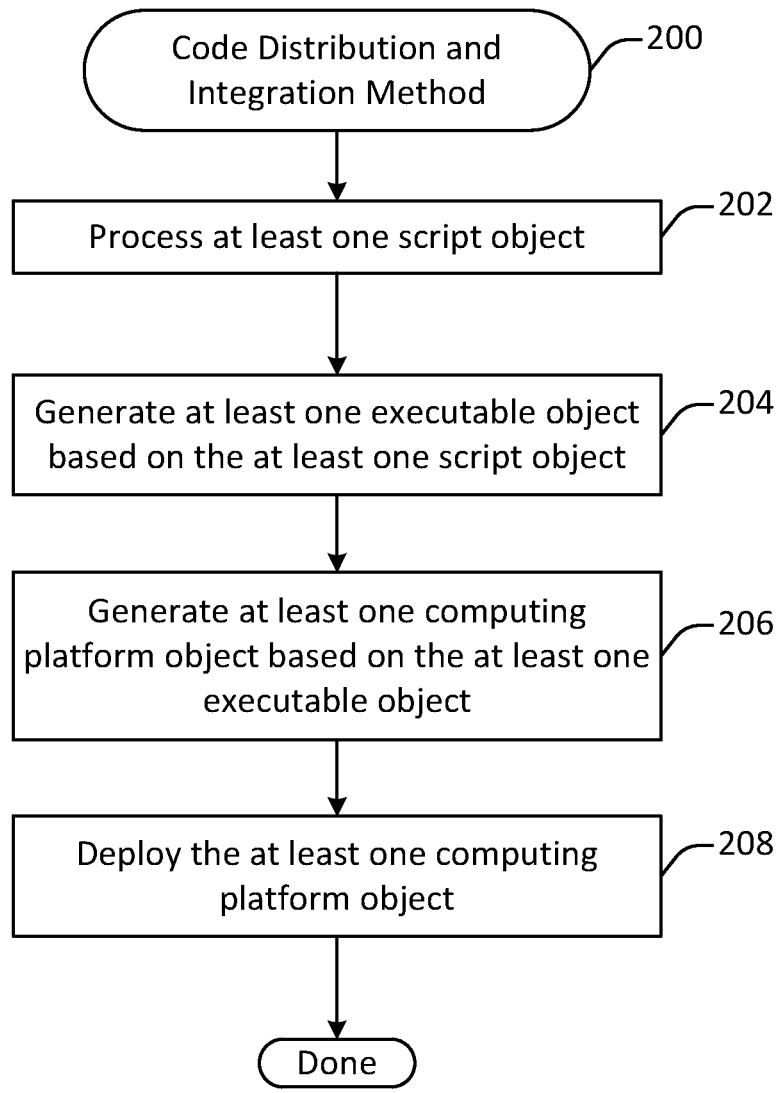
FIG. 2 illustrates a flow chart of an example of a method for code distribution and integration within a distributed computing platform, performed in accordance with some implementations.

FIG. 2 illustrates a flow chart of an example of a method for code distribution and integration within a distributed computing platform, performed in accordance with some implementations. As previously discussed, implementations disclosed herein provide a computing platform engine that enables the development, integration, and deployment of custom code within the application hosted by the computing platform. Accordingly, a method, such as method 200 presented below, may be implemented to improve the development, integration, and deployment of such custom code, as well as provide novel tools associated with such development and deployment.

Method 200 may commence with operation 202 during which at least one script object may be processed. Accordingly, during operation 202, the at least one script object may be generated based on one or more inputs received from a user. As discussed above, the at least one script object may include user code written by the user in a custom scripting language.

Method 200 may proceed to operation 204 during which at least one executable object may be generated. In various implementations, the at least one executable object may be generated based on the received at least one script object. As noted above, the generation of the at least one executable object may be implemented by components of a computing platform engine that translate and transform the at least one script object into the at least one executable object. As also noted above, the at least one executable object is executable against an interface layer of the computing platform.

Method 200 may proceed to operation 206 during which at least one computing platform object may be generated. In various implementations, the computing platform engine may execute the at least one executable object against the interface layer to generate the at least one computing platform. In various implementations, the executing includes representational state transfer (REST) and simple object access protocol (SOAP) calls that are executed against the interface layer. The results are stored as computing platform objects that are stored in a format native to the application hosted by the computing platform. Moreover, various metadata associated with the executing may be stored. Accordingly, any error messages or other events may be recorded and reported to a user.

Method 200 may proceed to operation 208 during which the at least one computing platform object may be deployed in a computing platform. Accordingly, the at least one computing platform object may be provided to the computing platform and may be stored in a data store of the computing platform, Thus, the at least one computing platform object may be made widely available within the distributed computing platform, and may be accessible by various instances of an application. In some implementations, the at least one computing platform object may be stored in an application account.

Figure 3:
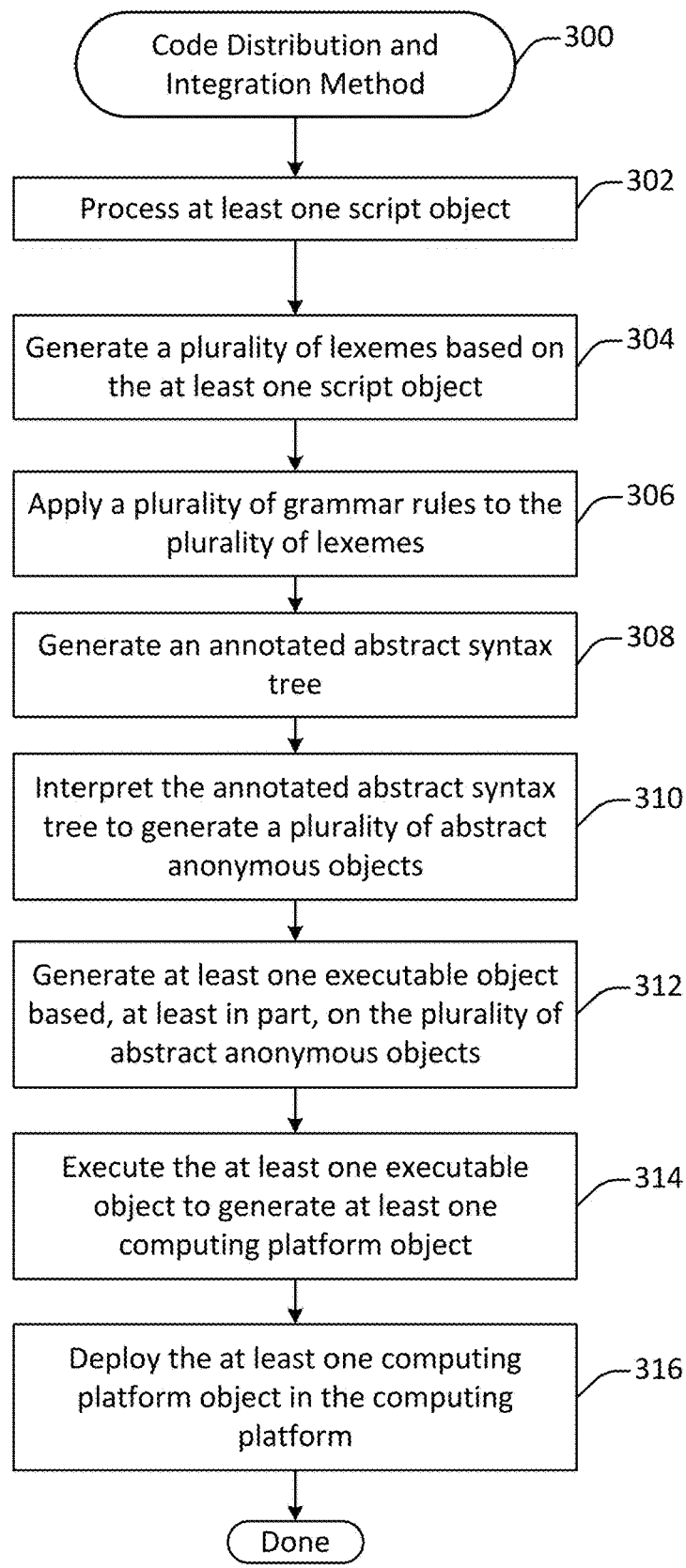
FIG. 3 illustrates a flow chart of another example of a method for code distribution and integration within a distributed computing platform, performed in accordance with some implementations.

FIG. 3 illustrates a flow chart of another example of a method for code distribution and integration within a distributed computing platform, performed in accordance with some implementations. As previously discussed, implementations disclosed herein provide a computing platform engine that enables the development, integration, and deployment of custom code within an application hosted by a computing platform. As will be discussed in greater detail below with reference to method 300, implementations of such a computing platform engine enable a user to efficiently generate and deploy code in a computing platform, and in a manner that provides novel developer tools, such as tracking of version histories associated with such code.

Method 300 may commence with operation 302 during which at least one script object may be processed. As noted above, the script object may be a file that is written in a scripting language that has a custom designed format that displays configuration parameters and code in a human readable format. Accordingly, data files utilized by a distributed computing platform that may typically be implemented in JSON and XML may instead be represented in a custom scripting language that is configured based on the implementation of the distributed computing platform. In various implementations, a script object may have been generated by a user based on input received at a client machine, and the user may have indicated that code included in the script object should be integrated with and deployed within the distributed computing platform. Accordingly, during operation 302, the script object may be processed to identify subsequent operations implemented by the computing platform engine as discussed in greater detail below.

Such processing may include identifying one or more components of the contents of the script object as well as associated metadata.

Method 300 may proceed to operation 304 during which a lexer included in a script engine may create various lexemes from characters included in the script object. Accordingly, the lexer may define lexical rules, and may scan the script object to identify input stream parameters, and to form tokens and lexemes based on identified collections of characters. In some implementations, the scanning is implemented in a line-by-line manner. In various implementations, a lexeme is a basic lexical unit that may include one word or several words, and may be considered as an abstract unit. Such formation of tokens and lexemes based on the characters is defined by the custom script language described above. Accordingly, an output generated by the lexer may be a collection of lexemes generated based on rules stored and maintained by the script engine.

Method 300 may proceed to operation 306 during which grammar rules may be applied. In various implementations, the grammar rules are applied by the script engine discussed above with reference to FIG. 1. In some embodiments, the grammar rules may be implemented based on an augmented JSON format, and may be a context-free grammar that reads left to right and top down. Furthermore, the grammar rules may be identified based on a particular type of data object of the computing platform. As discussed above, such types of data objects may correspond to various components of the computing platform, such as data extensions, user searches, queries, emails, and automation. Accordingly, grammar rules may be stored in a grammar file that is specific to and configured based on a particular data object type of the computing platform. Accordingly, the script engine includes multiple grammar rules, and each rule is used to process one or more lexemes. During operation 306, an output is generated that includes one or more abstract syntax tree nodes in a syntax tree. Such abstract syntax tree nodes represent the abstract syntactic structure of the script object. The output may also include error or exception identifiers and/or notifications. Accordingly, if the syntax utilized to generate the script object is malformed or if an unexpected character occurrence is detected, one or more errors/exceptions may be identified. The identified errors and exceptions may be stored in a record associated with the script object, and may also be used to generate a notification that reports the errors and exceptions.

Method 300 may proceed to operation 308 during which a parser may generate an annotated abstract syntax tree for the originally received script object. In various implementations, the parser executes one or more production rules to form one single annotated abstract syntax tree that logically represents the logic written in the originally received script object. The abstract syntax tree is generated by ordering the nodes in a format that is configured based on one or more transformation operations discussed in greater detail below. Accordingly, the generation of the annotated abstract syntax tree is implemented based on format determined by a subsequently implemented transformation process that is specific to the application hosed by the computing platform.

Method 300 may proceed to operation 310 during which an interpreter may interpret the annotated abstract syntax tree. The interpreter is configurable to scan and read the annotated abstract syntax tree based on one or more rules defined by the computing platform engine. The annotated abstract syntax tree is converted to a collection of abstract anonymous objects based on the application of the rules to the annotated abstract syntax tree. The interpreter is further configured to identify one or more actions to be implemented. For example, such actions may be actions, such as a Create( ) action, that are to be performed on the abstract anonymous objects that are generated at this stage of transformation. In this way, during operation 310, abstract anonymous objects are generated, and one or more actions may be identified and implemented on the abstract anonymous objects.

Method 300 may proceed to operation 312 during which at least one executable object may be generated. In various implementations, the abstract anonymous objects are transformed into structured objects that are readable by the computing platform engine such that they are executable against an existing interface layer of the computing platform. Accordingly, the structured objects may be executable objects that are custom designed logical objects containing attributes and values utilized by the computing platform engine to execute the objects against the computing platform's interface layer which may have components that are public and/or private.

Method 300 may proceed to operation 314 during which the at least one executable object may be executed to generate at least one computing platform object. Accordingly, during operation 3:14, the computing platform engine executes the executable object, and the appropriate calls are executed against the interface layer. As discussed above, such calls may be REST and SOAP calls that are handled by the computing platform engine. In various implementations, one or more computing platform objects are generated based on the executing of the executable object. As discussed above, such computing platform objects are objects that are implemented in a format native to the application hosted by the computing platform, and may be executed by the application on the computing platform. In various implementations, during operation 314, additional data objects may be generated such as a custom data record that includes full definitions of columns as well as any attributes to be set for the custom data record. During operation 314, any errors that were encountered may be recorded, and such errors may be used to generate a message that is sent back to a client machine and displayed at a user interface of the client machine.

Method 300 may proceed to operation 316 during which the at least one computing platform object may be deployed within the computing platform. Accordingly, during operation 316 the application hosted by the computing platform may execute the computing platform object, or may update or modify the computing platform object. Moreover, the computing platform object may be distributed to other nodes within the computing platform. Furthermore, any errors encountered during the process of deployment may also be logged and included in an error message provided to a user, if appropriate. In this way, the newly generated computing platform object may be distributed and propagated throughout nodes utilized to implement an instance of the application hosted by the computing platform.

Figure 4:
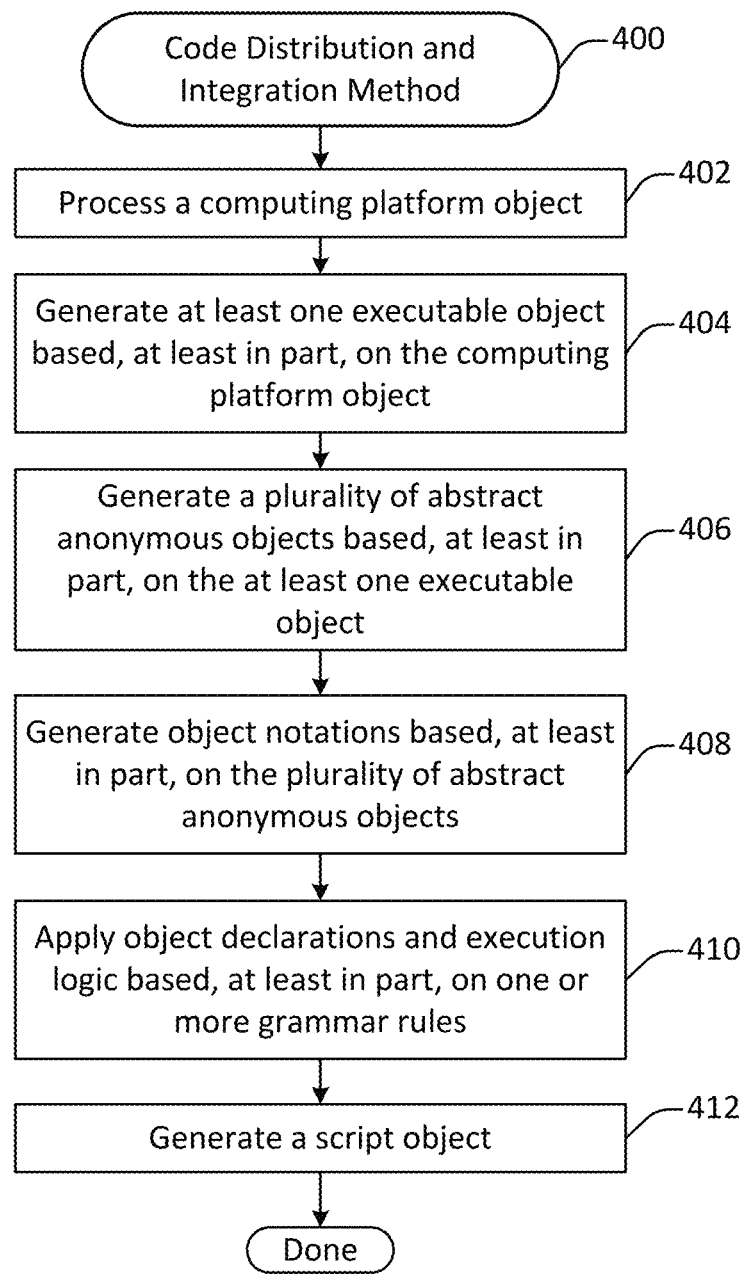
FIG. 4 illustrates a flow chart of yet another example of a method for code distribution and integration within a distributed computing platform, performed in accordance with some implementations.

FIG. 4 illustrates a flow chart of another example of a method for code distribution and integration within a distributed computing platform, performed in accordance with some implementations. As will be discussed in greater detail below with reference to method 400, a computing platform engine as disclosed herein may also obtain computing platform objects and transform them into script objects that are modifiable by a user. In this way, implementations disclosed herein provide users with bidirectional transformation between script objects and computing platform objects. In one example, the method disclosed in method 400 may be used to access configuration code of an application hosted by a computing platform, and make modifications to that configuration code.

Method 400 may commence with operation 402 during which a computing platform object may be processed. Accordingly, during operation 402 a particular computing platform object may be identified and retrieved by a system component, such as the computing platform engine discussed above with reference to FIG. 1. In various implementations, the computing platform object may be identified by a user via a user interface, or may be identified by a system component, such as the computing platform engine. In some implementations, the computing platform object may be identified based on an identification of a particular application, as well as an identification of a particular component or function of the application that may correspond to a particular computing platform object or class of computing platform objects.

Method 400 may proceed to operation 404 during which at least one executable object may be generated. As discussed above, executable objects are objects that are executable by the computing platform engine against an existing interface layer of the computing platform. In various implementations, the executable object is generated based on the computing platform object by applying one or more rules the computing platform object to generate structured objects that are readable by the computing platform engine. Accordingly, the rules applied may be configured to implement operations that are the reverse of those that may be implemented, such as particular REST and SOAP calls, during code deployment. In this way, at least one executable object may be generated.

Method 400 may proceed to operation 406 during which abstract anonymous objects may be generated. In various implementations, the executable object is scanned, and abstract anonymous objects are generated based on the executable object. As similarly discussed above, the transformation of the executable object to the abstract anonymous objects is implemented based on a set of rules. The rules utilized during operation 406 may be configured to implement the opposite of the rules discussed above with reference to operation 312. Accordingly, a reverse transformation may be implemented to transform the executable object into the abstract anonymous objects.

Method 400 may proceed to operation 408 during which object notations may be generated based, at least in part, on the abstract anonymous objects. Accordingly, during operation 408, the abstract anonymous objects may be used to generate object notations which are then appended to and included in the abstract anonymous objects. For example, column lengths and column names may be added for objects. Accordingly, additional components, such as declaration steps and execution methods, may be added in accordance with the custom scripting language described above. In one example, the output of operation 408 is generated in accordance with an augmented JSON format, as similarly discussed above.

Method 400 may proceed to operation 410 during which object declarations and execution logic may be applied based, at least in part, on one or more grammar rules. Accordingly, the grammar rules may be used to apply object declarations and function declarations and append the objects based on the result of such applying. Thus, during operation 410, the objects may be appended such that dependency resolution is implemented, and appropriate steps and linkages are generated.

Method 400 may proceed to operation 412 during which a script object is generated. In various implementations, the script engine is configured to generate a script object based on the result of operation 410. Thus, the script object may be accessible by a user, and may be modified or edited in a similar manner as a script object that the user had generated himself or herself. In this way, a user-modifiable script object may be generated based on a computing platform object that is otherwise not accessible or modifiable in a practical manner. In various embodiments, when a user completes updates and modifications to a script object, a method such as method 300 may be implemented to deploy the updated script object. In this way, the computing platform engine facilitates the efficient modification, generation, and deployment of application code, such as computing platform objects.

Figure 5:
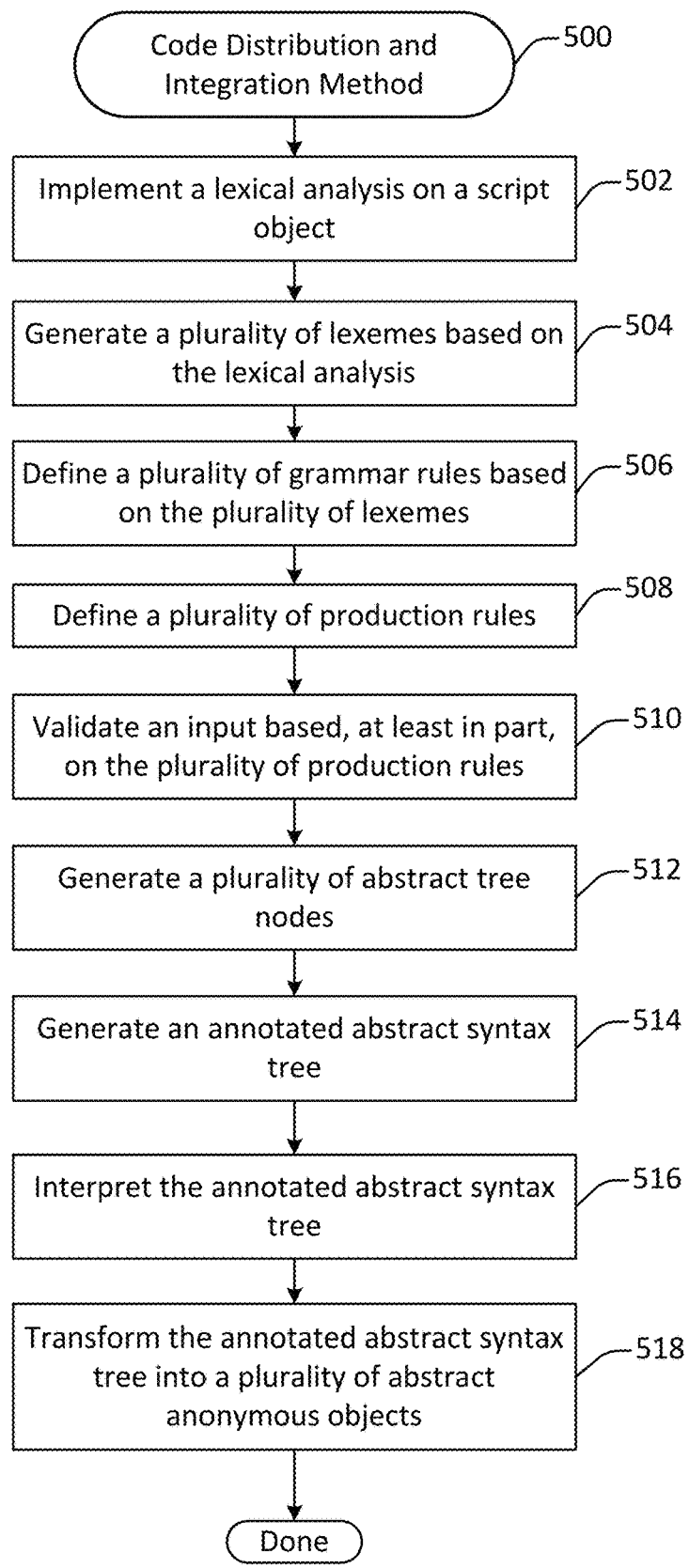
FIG. 5 illustrates a flow chart of an additional example of a method for code distribution and integration within a distributed computing platform, performed in accordance with some implementations.

FIG. 5 illustrates a flow chart of another example of a method for code distribution and integration within a distributed computing platform, performed in accordance with some implementations. As discussed above, a script engine may include various components, such as a lexer, grammar, a parser, and an interpreter. While various aspects of the script engine have been discussed above, method 500 described below provides additional details regarding the operation of the script engine.

Method 500 may commence with operation 502 during which a lexical analysis may be implemented. As similarly discussed above, the lexical analysis may be implemented based on a set of lexical rules that are stored and maintained by the computing platform engine. Accordingly, during operation 502, the script engine may scan a script object and may identify characters included in the script object as well as identify groups of characters included in the script object based on the lexical rules described above. In this way, an initial portion of the lexical analysis may be implemented.

Method 500 may proceed to operation 504 during which several lexemes may be created based on the lexical analysis. Accordingly, the script engine generates a data record that includes a sequence of lexemes. As noted above, lexemes may be identifiable sequences of characters, such as keywords, literals, identifiers, operators, and/or punctuation characters. In various implementations, the data record may also include one or more tokens that may be keywords, identifiers, numbers, or operators that are associated with or describe particular lexemes. In this way, the identified groupings of characters are stored sequentially in the data record as lexemes, and associated tokens may be identified based on the lexical rules, and stored as well.

Method 500 may proceed to operation 506 during which a grammar may be defined. As noted above, the grammar may be a set of formal rules that govern how valid lexemes in that programming language are constructed. As also discussed above, such grammar rules may be custom rules that are specific to the computing platform, and such grammar rules may be stored and maintained by the computing platform engine. Accordingly, during operation 506, the grammar rules may be identified and retrieved by the script engine.

Method 500 may proceed to operation 508 during which one or more production rules may be defined. In various implementations, the production rules may be specific grammar rules that are used to evaluate lexemes. Accordingly, during operation 508, specific production rules may be identified based on the lexemes and tokens stored in the data record at operation 501. In this way, a set of production rules may be determined based on a set of lexemes.

Method 500 may proceed to operation 510 during which an input may be validated. In various implementations, the input or input stream may be the input that provides the script object. Accordingly, the identified production rules may be used to determine if the lexemes included in the input are using correct and properly formed syntax. As noted above, if unexpected characters are identified, or if incorrect syntax is detected, one or more error messages may be generated. More specifically, an error identifier may be generated based on a type of error encountered, and a message may be generated based on the error identifier. For example, an error identifier may correspond to a text message that is sent to a user at a user interface.

Method 500 may proceed to operation 512 during which abstract syntax tree nodes may be generated. As similarly discussed above, abstract syntax tree nodes represent constructs occurring in the script object. Accordingly, during operation 512, syntactic constructs of the scripting language of the script object may be used to identify relationships between lexemes and other constructs, and generate abstract syntax tree nodes with identified relationships/dependencies.

Method 500 may proceed to operation 514 during which an annotated abstract syntax tree may be generated. Accordingly, as similarly discussed above, a parser included in the script engine executes the identified production rules on the abstract syntax tree nodes to form one single annotated abstract syntax tree that logically represents the logic written in the input script object. The logical formation of the annotated abstract syntax tree is implemented by ordering the nodes in a format that is compliant with the transformation process described in greater detail below with reference to FIG. 6.

Method 500 may proceed to operation 516 during which an annotated abstract syntax tree may be interpreted. Thus, according to various implementations, the script engine analyzes the annotated abstract syntax tree and identifies one or more production rules based on the analysis. As noted above, such production rules may be stored and maintained by the computing platform engine. As will be discussed in greater detail below, the production rules may be executed to complete the process of interpretation.

Method 500 may proceed to operation 518 during which the abstract syntax tree may be transformed into abstract anonymous objects. As noted above, the script engine may transform the annotated abstract syntax tree into abstract anonymous objects. The transformation of such an annotated abstract syntax tree into abstract anonymous objects may be implemented by executing the production rules identified above in operation 516. In this way, the script engine may generate an output that includes several abstract anonymous objects. As also discussed above, the script engine may also identify one or more actions to be performed on the abstract anonymous objects.

Figure 6:
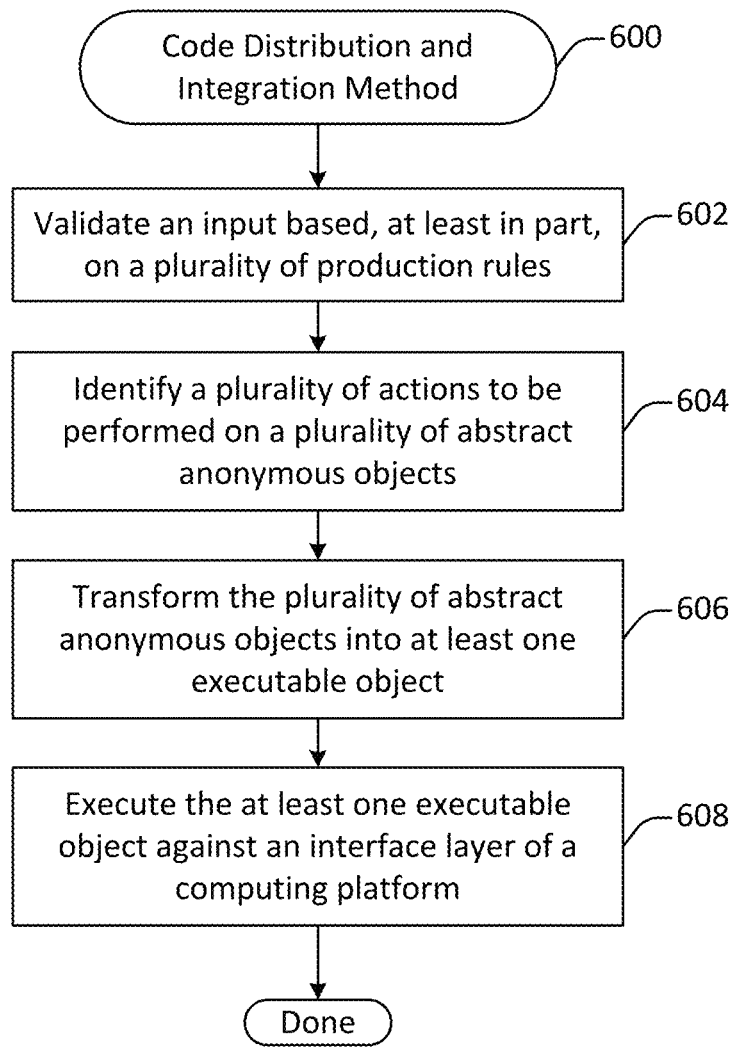
FIG. 6 illustrates a flow chart of another example of a method for code distribution and integration within a distributed computing platform, performed in accordance with some implementations.

FIG. 6 illustrates a flow chart of another example of a method for code distribution and integration within a distributed computing platform, performed in accordance with some implementations. As discussed above, an interface engine may transform an output of the script engine into executable objects, and may also execute the executable objects against an interface layer of a computing platform to generate computing platform objects.

Method 600 may commence with operation 602 during which an input may be validated. As similarly discussed above, the input may be validated by utilizing various grammar rules, and more specifically, various production rules. Accordingly, the abstract anonymous objects described above with reference to FIG. 5 may be validated based on one or more production rules to determine if the abstract anonymous objects included in the input are using correct and properly formed syntax. As previously discussed, if unexpected characters are identified, or if incorrect syntax is detected, one or more error messages may be generated. More specifically, an error identifier may be generated based on a type of error encountered, and a message may be generated based on the error identifier.

Method 600 may proceed to operation 604 during which one or more actions may be identified. As previously discussed, such actions may be actions that are to be performed on the abstract anonymous objects. Accordingly, during operation 604, the interface engine may identify one or more actions for each of one or more abstract anonymous objects. In various implementations, the identification of the actions is determined based on production rules that may map particular abstract anonymous objects to particular actions.

Method 600 may proceed to operation 606 during which the abstract anonymous objects may be transformed into executable objects. As similarly discussed above, the abstract anonymous objects may be transformed by executing the production rules and the actions against the abstract anonymous objects. In this way, each abstract anonymous object may be transformed into an executable object, and the executable objects may be stored by the computing platform engine. In various embodiment, the interface engine may also store additional data associated with the generation of the executable objects. For example, if an executable object is an updated or modified version of an existing executable object, both versions may be stored and retained with associated version numbers or other sequential or temporal identifier. In this way, version histories may be maintained as part of the process of generating the executable objects.

Method 600 may proceed to operation 608 during which the executable objects may be executed against an interface layer of a computing platform. As also discussed above, the interface engine executes the executable object, and the appropriate calls are executed against the interface layer. As discussed above, such calls may be REST and SOAP calls. In various implementations, one or more computing platform objects are generated based on the executing of the executable object. In various implementations, the interface engine may also store metadata associated with the execution of the executable objects. Such metadata may include timestamp data as well as system data identifying system components involved in the executing. Moreover, version histories may be maintained for computing platform objects as well, More specifically, different versions may be stored and retained with associated version numbers or other sequential or temporal identifier for updates and modifications of computing platform objects.

Figure 7:
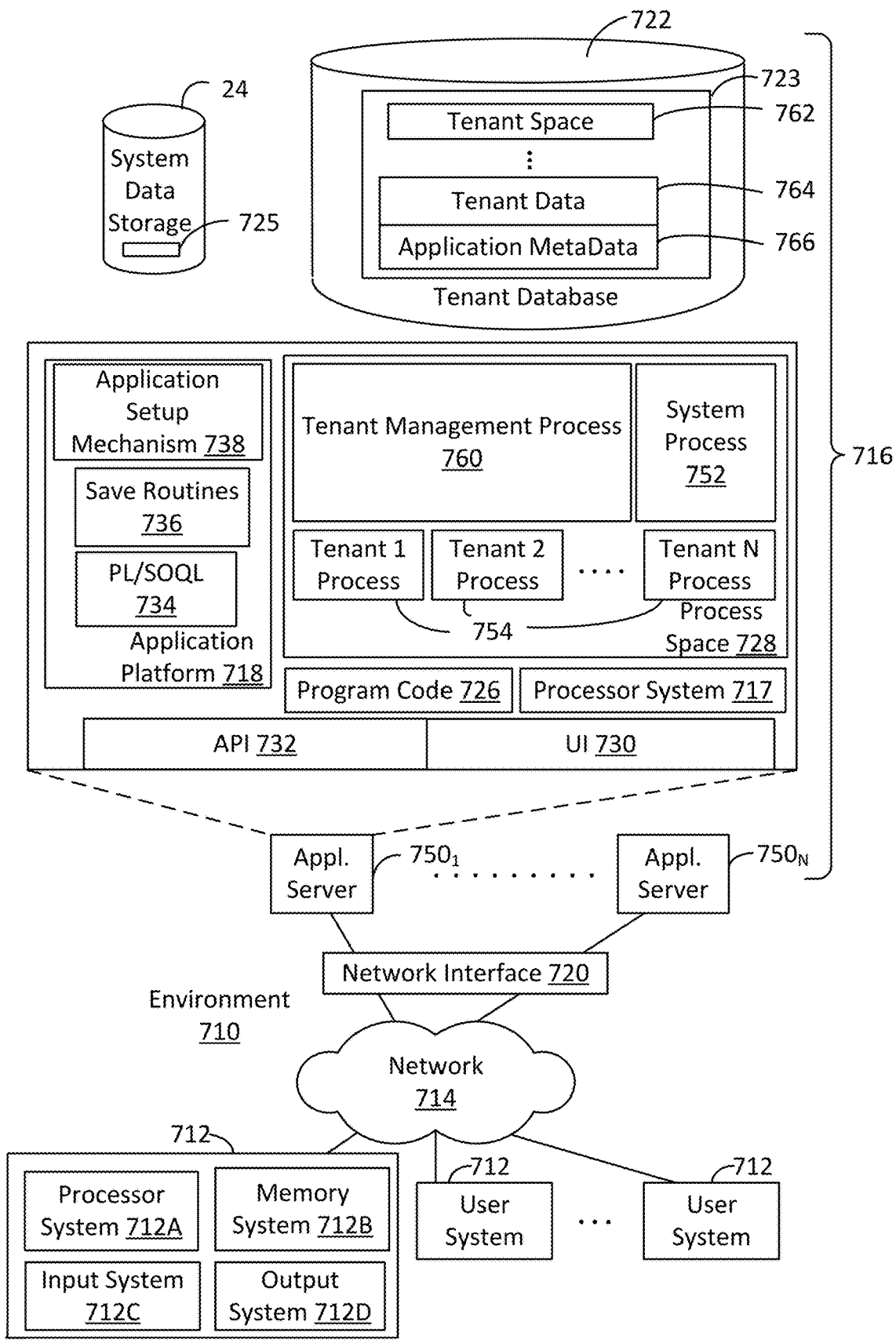
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 7504 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based code distribution and integration system. For example, in some implementations, system 716 may include application servers configured to implement and execute code distribution and integration operations associated with SaaS software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a marketing platform, a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. Database systems may also store data associated with individuals and entities that are associated with marketing communication messages utilized by a marketing platform. Such data may include identifiers, metadata, as well as data event information. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
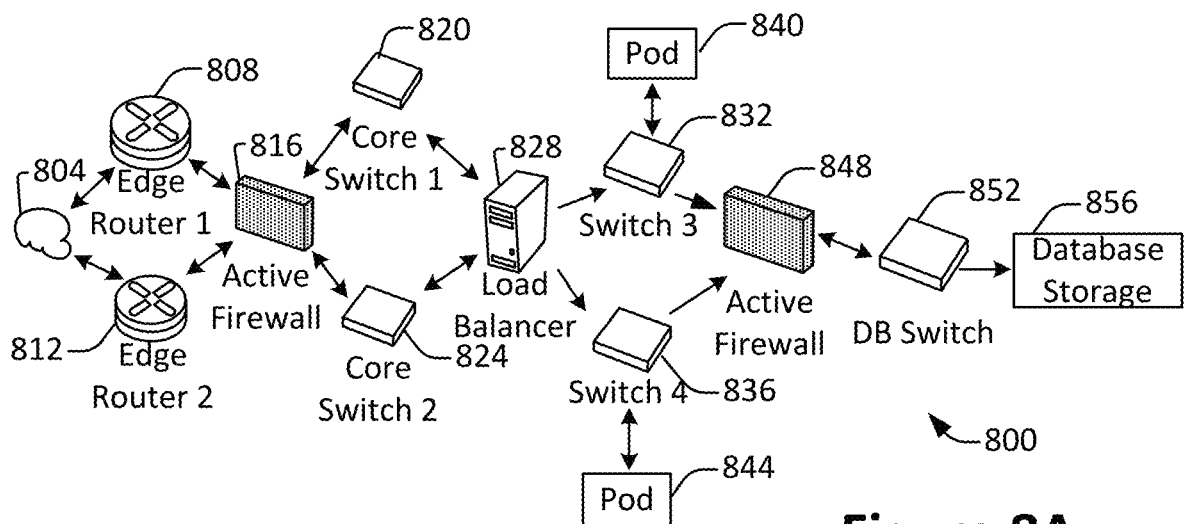
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process marketing platform data as well as communication channel information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the Internet.

In one or more implementations, the firewall 816 may protect the inner components of the environment 800 from Internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800, The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824, Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
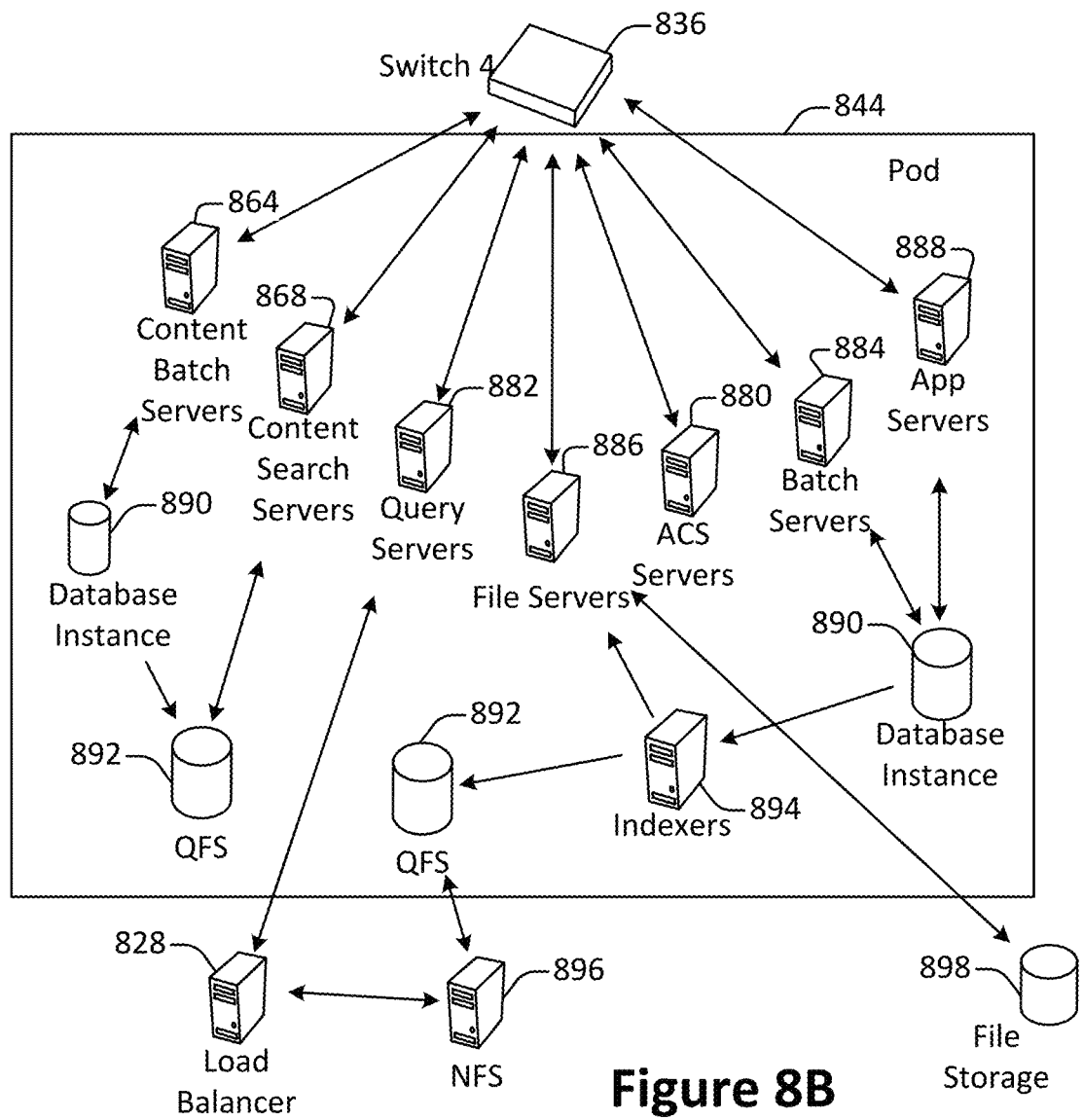
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times, Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
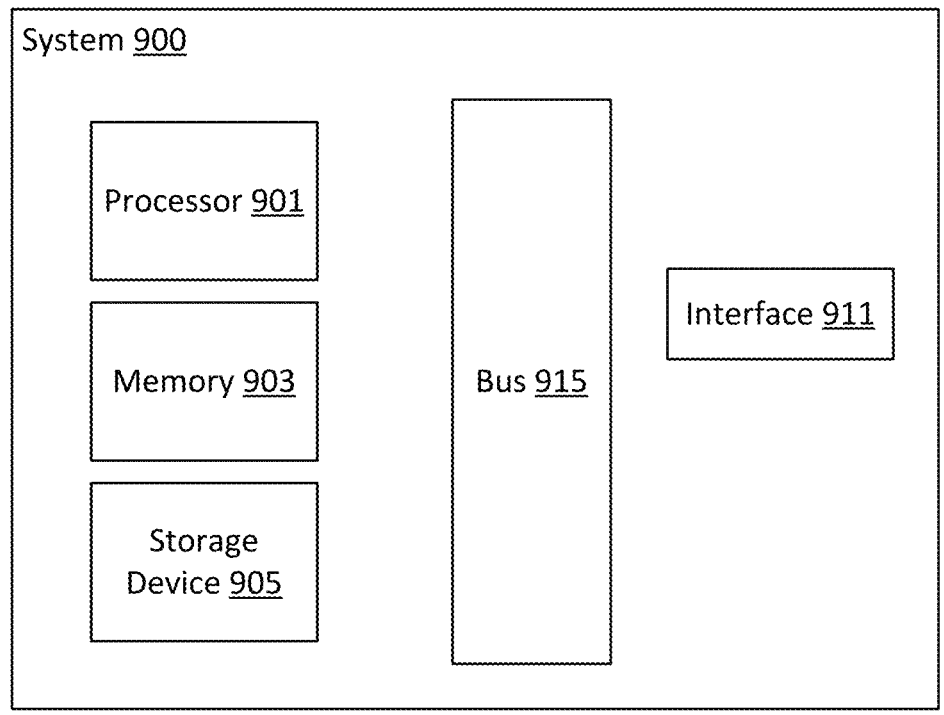
FIG. 9 illustrates one example of a computing device.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A computing platform implemented using a server system, the computing platform being configurable to cause:
processing a script object generated based on an input from a user, the script object comprising, at least in part, user code written in a custom scripting language that comprises custom grammar and syntax rules specific to an implementation of an application hosted by the computing platform;
generating an executable object based on the script object, the generating of the executable object being implemented by a computing platform engine communicatively coupled to an interface layer of the computing platform, the executable object being executable by the computing platform engine;

executing the executable object against the interface layer associated with the computing platform, the interface layer being configured to provide an interface to an application account associated with an application implemented within the computing platform, and the executing comprising executing one or more calls from the computing platform engine to the interface layer; and generating at least one computing platform object based, at least in part, on the executing of the executable object at the interface layer, the at least one computing platform object being a configuration data object of the application and having a format native to the computing platform, and the generating being based, at least in part, on results of the one or more calls executed by the computing platform engine.

2. The computing platform of claim 1, wherein the generating of the executable object further comprises:
generating a plurality of lexemes based, at least in part, on the script object and the custom scripting language; and
generating an abstract syntax tree based, at least in part, on the plurality of lexemes.

3. The computing platform of claim 2, wherein the generating of the executable object further comprises:
generating a plurality of abstract anonymous objects based, at least in part, on the abstract syntax tree.

4. The computing platform of claim 3, wherein the generating of the at least one computing platform object further comprises:
transforming the plurality of abstract anonymous objects into a plurality of executable objects.

5. The computing platform of claim 1, wherein executing the executable object against the interface layer associated with the computing platform further comprises:
implementing one or more representational state transfer (REST) calls via the interface layer, the one or more REST calls being determined by the computing platform engine based on the executable object.

6. The computing platform of claim 1, wherein executing the executable object against the interface layer associated with the computing platform further comprises:
implementing one or more simple object access protocol (SOAP) calls via the interface layer, the one or more SOAP calls being determined by the computing platform engine based on the executable object.

7. The computing platform of claim 1, the computing platform being further configurable to cause:
updating the application based on the at least one computing platform object; and
storing the at least one computing platform object in a data store of the computing platform.

8. The computing platform of claim 1, the computing platform being further configurable to cause:
updating a version history of the at least one computing platform object.

9. The computing platform of claim 1, wherein the input is received via a user interface of a client machine.

10. A method comprising:
processing a script object generated based on an input from a user, the script object comprising, at least in part, user code written in a custom scripting language that comprises custom grammar and syntax rules specific to an implementation of an application hosted by the computing platform;

generating an executable object based on the script object, the generating of the executable object being implemented by a computing platform engine communicatively coupled to an interface layer of the computing platform, the executable object being executable by the computing platform engine;

executing the executable object against the interface layer associated with the computing platform, the interface layer providing an interface to an application account associated with an application implemented within the computing platform, and the executing comprising executing one or more calls from the computing platform engine to the interface layer; and generating at least one computing platform object based, at least in part, on the executing of the executable object at the interface layer, the computing platform object being a configuration data object of the application and having a format native to the computing platform, and the generating being based, at least in part, on results of the one or more calls executed by the computing platform engine.

11. The method of claim 10, wherein the generating of the executable object further comprises:
generating a plurality of lexemes based, at least in part, on the script object and the custom scripting language;
generating an abstract syntax tree based, at least in part, on the plurality of lexemes; and
generating a plurality of abstract anonymous objects based, at least in part, on the abstract syntax tree.

12. The method of claim 11, wherein the generating of the at least one computing platform object further comprises:
transforming the plurality of abstract anonymous objects into a plurality of executable objects.

13. The method of claim 10, wherein the executing the executable object against the interface layer associated with the computing platform further comprises:
implementing one or more representational state transfer (REST) calls via the interface layer, the one or more REST calls being determined by the computing platform engine based on the executable object.

14. The method of claim 10, wherein the executing the executable object against the interface layer associated with the computing platform further comprises:
implementing one or more simple object access protocol (SOAP) calls via the interface layer, the one or more SOAP calls being determined by the computing platform engine based on the executable object.

15. The method of claim 10 further comprising
updating the application based on the computing platform object; and
storing the computing platform object in a data store of the computing platform.

16. The method of claim 10 further comprising:
updating a version history of the computing platform object.

17. The method of claim 10, wherein the input is received via a user interface of a client machine.

18. A computer program product comprising non-transitory computer-readable program code capable of being executed by one or more processors when retrieved from a non-transitory computer-readable medium, the program code comprising instructions configurable to cause the one or more processors to perform a method comprising:
processing a script object generated based on an input from a user, the script object comprising, at least in part, user code written in a custom scripting language that comprises custom grammar and syntax rules specific to an implementation of an application hosted by the computing platform;

generating an executable object based on the script object, the generating of the executable object being implemented by a computing platform engine communicatively coupled to an interface layer of the computing platform, the executable object being executable by the computing platform engine;

executing the executable object against the interface layer associated with the computing platform, the interface layer providing an interface to an application account associated with an application implemented within the computing platform, and the executing comprising executing one or more calls from the computing platform engine to the interface layer; and generating at least one computing platform object based, at least in part, on the executing of the executable object at the interface layer, the computing platform object being a configuration data object of the application and having a format native to the computing platform, and the generating being based, at least in part, on results of the one or more calls executed by the computing platform engine.

19. The computer program product recited in claim 18, wherein the generating of the executable object further comprises:

generating a plurality of lexemes based, at least in part, on the script object and the custom scripting language;

generating an abstract syntax tree based, at least in part, on the plurality of lexemes; and generating a plurality of abstract anonymous objects based, at least in part, on the abstract syntax tree.

20. The computer program product recited in claim 19, wherein the generating of the at least one computing platform object further comprises:

transforming the plurality of abstract anonymous objects into a plurality of executable objects.

* * * * *